COMBINATION STORAGE CONTAINER AND VOTING ENCLOSURE FOR VOTE RECORDERS

Filed Sept. 23, 1968

INVENTOR
IRA G. LAWS
by
Mason, Kolehmainen, Rathburn and Wyss
ATTORNEYS

INVENTOR
IRA G. LAWS
by
Mason, Kolehmainen, Rathburn and Wyss
ATTORNEYS

INVENTOR
IRA G. LAWS
by
Mason, Kolehmainen, Rathburn and Wyss
ATTORNEYS.

3,544,184

COMBINATION STORAGE CONTAINER AND VOTING ENCLOSURE FOR VOTE RECORDERS

Ira G. Laws, Tulsa, Okla., assignor to Seismograph Service Corporation, Tulsa, Okla., a corporation of Delaware Filed Sept. 23, 1968, Ser. No. 761,477
Int. Cl. A47b *43/02*
U.S. Cl. 312—259 3 Claims

ABSTRACT OF THE DISCLOSURE

A combination storage container and voting enclosure for a vote recording device comprising a base having a bottom wall and upstanding sidewalls. A cover member including a top wall is hingedly attached to the base along an upper edge of one of the sidewalls for movement between a closed position, nested within said base and an upstanding or open position when the vote recorder is to be used. A replaceable voting enclosure member is removably nested within the cover member against the top wall and includes a back wall and a pair of curtain flaps hingedly joined to opposite edges of the back wall. The curtain flaps are movable between a position folded adjacent the back wall and an extended position generally normal to the back wall forming the voting enclosure. The lower edges of the flaps are extended into the base adjacent a pair of opposite sidewalls thereof for supporting the back wall and cover member in an upright position relative to the base when forming a voting enclosure.

The present invention relates to a new and improved combination storage container and voting enclosure for a vote recording device, and more particularly relates to a device adapted for use with vote recording devices of the type described in copending United States patent application Ser. No. 574,106, filed Aug. 22, 1966, which application is assigned to the same assignee as the present invention.

With the advent of new types of light-weight, portable, vote recorders, as described in the aforementioned copending patent appliaction, it is desirable, and therefore an object of the present invention to provide a new and improved low cost, protective device therefor which serves as a combination storage container and/or booth voting enclosure suitable for use when voting. Moreover, because of the light-weight, small size, and portable nature of the vote recorders of the type described, the recorders are subject to more frequent abuse and rough handling, and a combination storage container and voting enclosure should be strong, yet low in cost so that, when damaged, replacement is relatively inexpensive.

The combination storage container and voting enclosure of the present invention provides good physical protection for a vote recorder while in storage and while being handled and transported from place to place and, when the recorder is in use during an election, provides a voting enclosure or boothlike structure to protect the privacy of the voter marking his ballot.

Another object of the present invention is the provision of a new and improved combination storage container and voting enclosure including a separate, readily replaceable, removable vote enclosure forming member which is nestable within the container when stored and is movable outwardly from a nested condition to form a voting enclosure for protecting a voter's privacy during the voting process.

Another object of the present invention is to provide a new and improved combination storage container and voting enclosure wherein the voting enclosure is formed of low-cost material and is readily replaceable when damaged or mutilated.

Another object of the present invention is the provision of a new and improved combination storage container and voting enclosure which is low in cost, simple of construction, and affords excellent protection for a vote recorder stored or transported therein and, in addition, provides a convenient voting enclosure or booth when the vote recorder is used during an election.

The foregoing and other objects and advantages of the present invention are accomplished in an illustrated embodiment thereof comprising a base member having a bottom wall and a plurality of upstanding sidewalls forming an enclosure for containing a vote recorder. A cover member, including a top wall is hingedly attached to the base member along an upper edge of one of the sidewalls, and the cover is movable between a closed position, nested within the base member, and an upstanding position, when the vote recorder is to be used for voting. A replaceable voting enclosure member is removably nested in the cover member against the top wall and includes a back wall and a pair of side curtain flaps hingedly connected to opposite side edges of the back wall. The curtain flaps are movable between a folded or flattened position adjacent the back wall and an open or extended position normal to the back wall when forming a voting enclosure. The lower edges of the flaps are extended and nested into the base member adjacent opposite sidewalls for supporting the back wall and the cover member in an upright position for voting. The curtain flaps are folded against the back wall, and the voting enclosure is nested in the cover member affording additional protection for the vote recorder, storage handling, and transportation.

For a better understanding of the present invention, reference should be had to the following detailed description when taken in conjunction with the drawings in which.

Figures 1, 3:
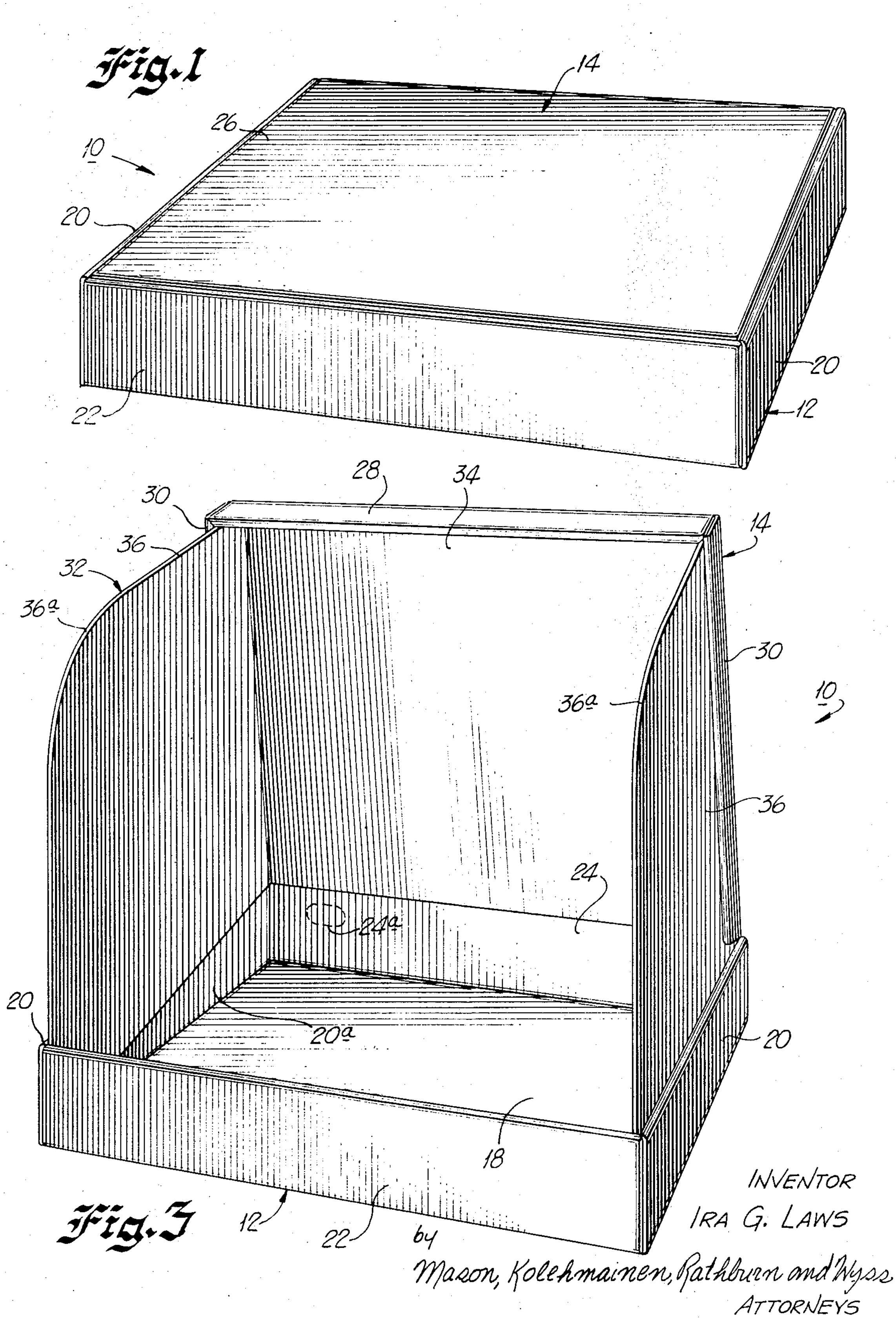
FIG. 1 is a front perspective view of a new and improved device comprising a combination storage container and voting enclosure for a vote recorder and illustrates the device in a closed configuration to provide for the protection and storage of a vote recorder.
FIG. 3 is a front perspective view of the device of FIG. 1 shown in an open position for voting with side curtain flaps of a voting enclosure member folded outwardly and nested within a base member holding the vote recorder.
Figures 5, 6:
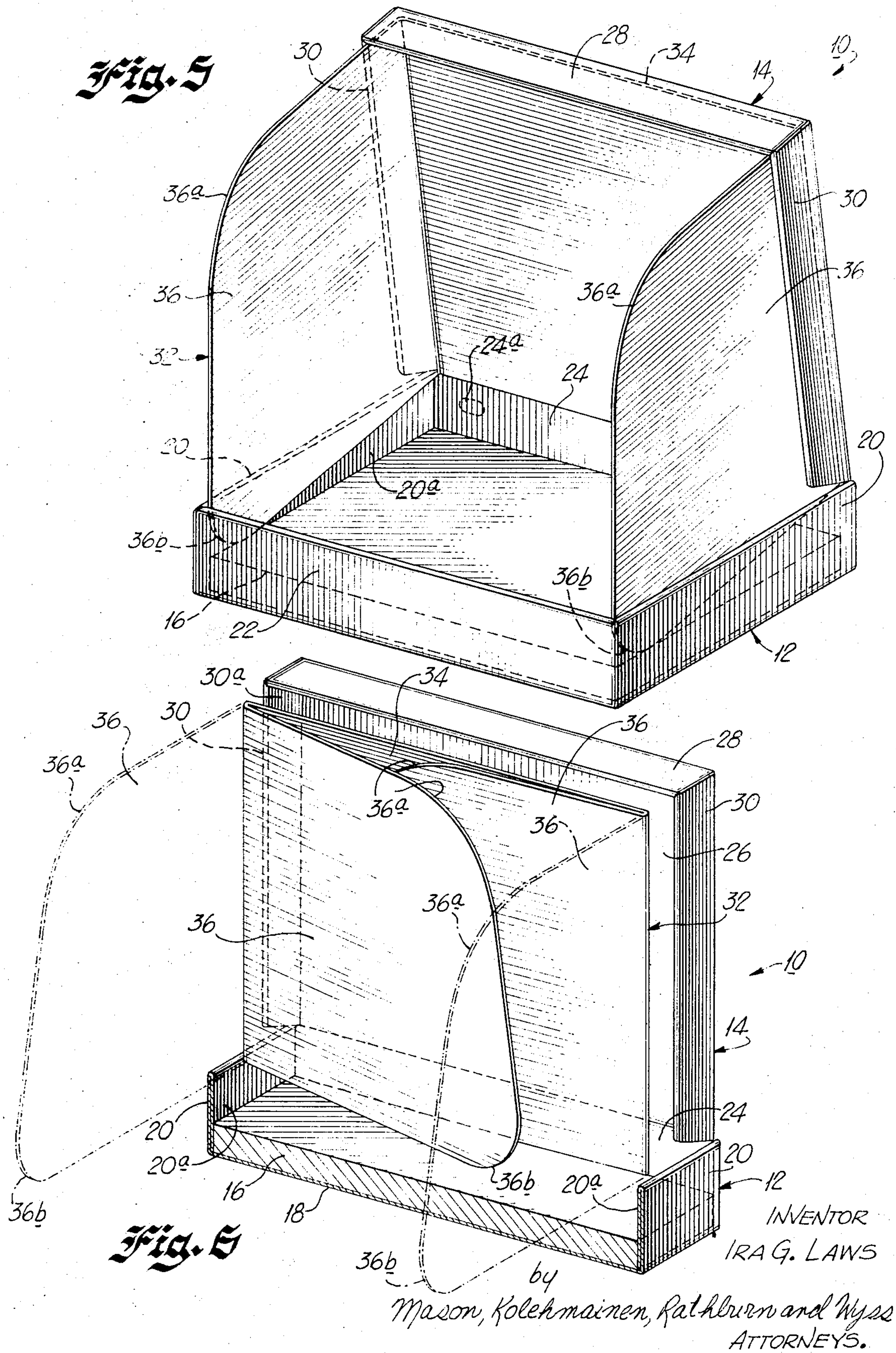

FIG. 5 is a front perspective view of the device similar to FIG. 3 illustrating a vote recorder mounted in position in the base; and FIG. 6 is a fragmentary front perspective view, similar to FIG. 5, illustrating the voting enclosure forming member in a folded position with the side curtains folded against the back wall ready for nesting in the cover member of the enclosure. The dotted lines in FIG. 5 indicate the positions of the side curtains as they are pivoted outwardly to a voting enclosure.

Referring now more particularly to the drawings, therein is illustrated a new and improved combination storage container and voting enclosure for a vote recorder of the type described in the aforementioned U.S. copending patent application, wherein the voter makes his selections by punching a ballot card with a stylus. These vote recorders are relatively light-weight and small in size and are easily transported from a storage point to the various outlying precincts where the voting will take place. The combination storage container and voting enclosure device of the present invention is referred to generally by the reference numeral 10 and serves as a protective enclosure or covering for a vote recorder of the type described when the recorder is not in use for voting. In addition, the device 10 provides a voting booth or enclosure for the vote recorder when it is used during an election, and affords privacy to the voter in making his selections with the vote recorder.

Figure 2:
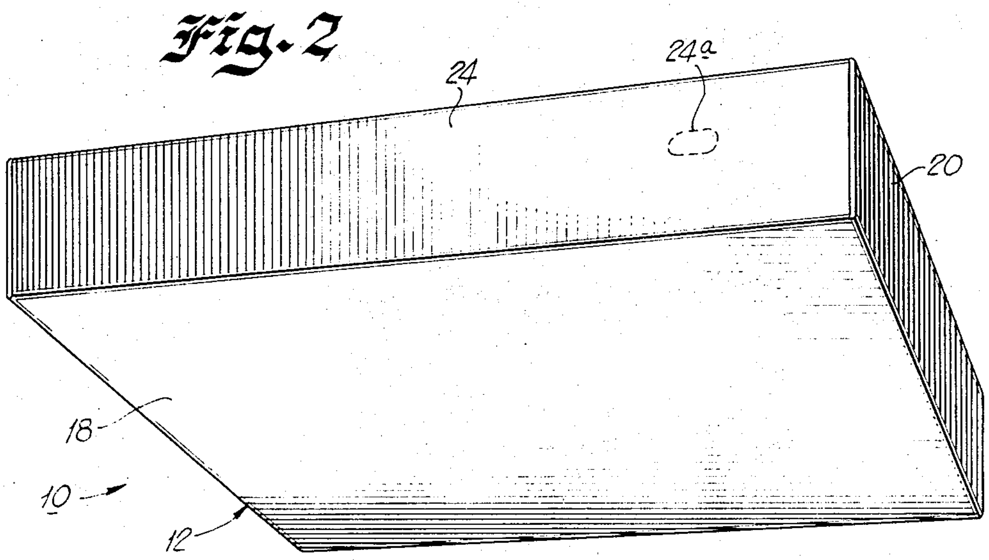
FIG. 2 is a rearward perspective view of the device of FIG. 1.

FIGS. 1 and 2 of the drawings illustrate the device 10 in a closed or storage condition and the other figures in the drawings illustrate the device in an open condition for voting. Because vote recorders and the protective covers or enclosures therefor are subjected to extremely hard usage and wear during election, it is desirable and therefore within the province of the present invention to provide a replaceable relating inexpensive device for enclosing and protecting a vote recorder when it is not being used and which is adaptable to provide a voting booth or enclosure for a person using the recorder during an election.

Figure 4:
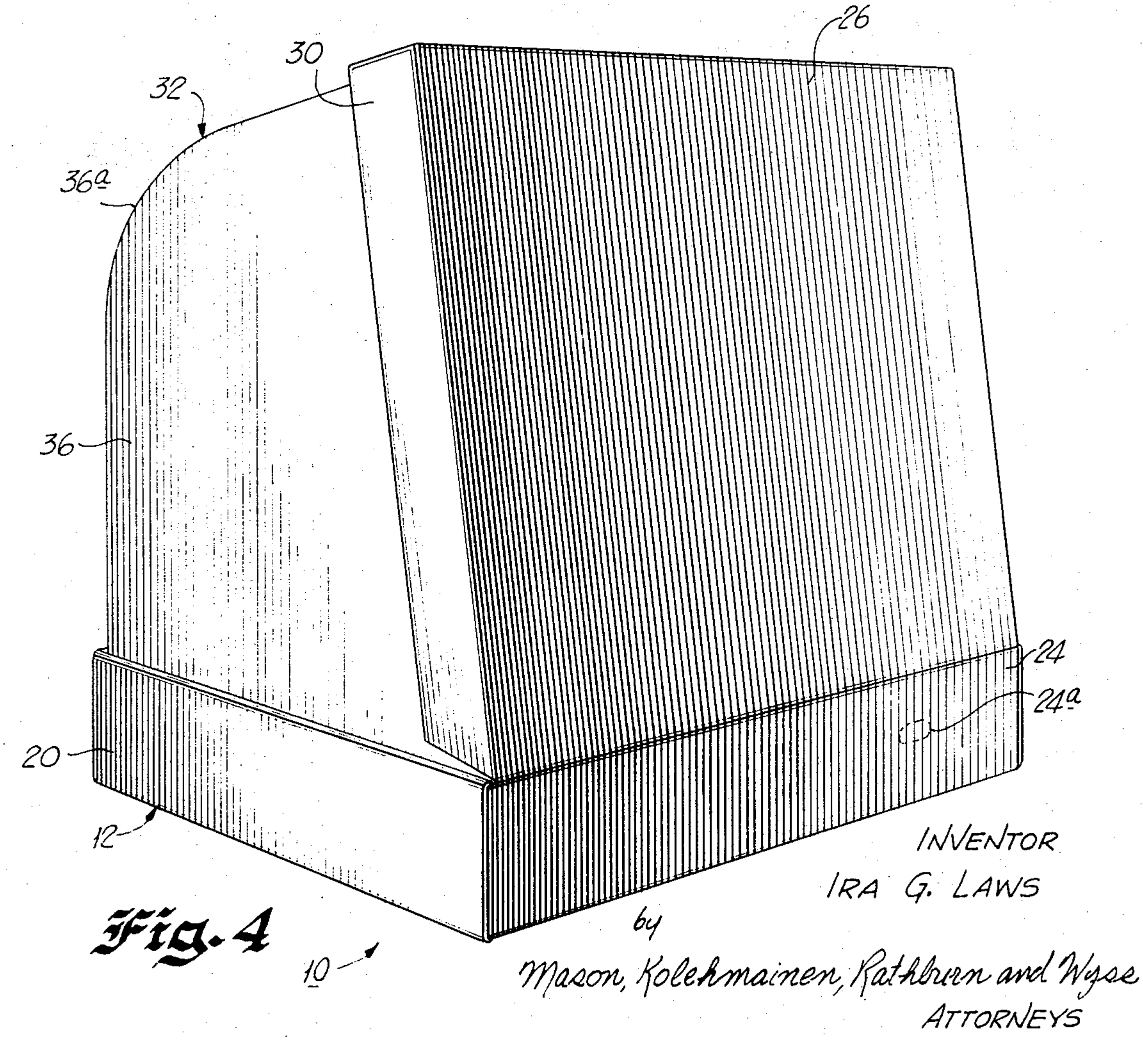
FIG. 4 is a rearward perspective view of the open device of FIG. 3.

In accordance with the present invention, the device 10 includes a base member 12 and cover member 14 hingedly connected together as shown in FIG. 4 and preferably formed of readily available, inexpensive material, such as corrugated paperboard or box material. The bottom member 12 is adapted to hold a vote recorder 16 of the general type disclosed in the aforementioned copending U.S. patent application (indicated in schematic form in FIGS. 5 and 6), and includes a bottom wall 18, a pair of outer sidewalls 20, a front wall 22, and back wall 24. The sidewalls 20 are provided with inner, downwardly extending stiffening flaps **20*a* (FIG. 6), and the front wall 22 may also be provided with a similar, downwardly extending inside stiffening member. The back wall 24 of the base member 12 is hingedly joined to a top wall 26 of the cover member 14, as best shown in FIG. 4, and the cover member is pivotal relative to the base between an upright position of FIGS. 3 and 4 and are nested or closed position as shown in FIGS. 1 and 2, wherein the closed device 10** appears as a rectangular box.

The cover member 14 includes a downwardly depending front wall 28 at the forward edge of the top wall 26 and a pair of downwardly depending opposite sidewalls 30 are provided along opposite side edges of the top wall. The sidewalls 30 and front wall 28 of the cover member 14 may be provided with inside stiffening flaps like the flaps **26*a* for strengthening the cover member and aiding in joining the sidewalls 30 with the front wall 28** at the corners.

Electrict power is required for operating the lights and other equipment on the vote recorder 16 mounted in the base member 12 and a punch-out opening **24*a* is provided in the back wall 24 of the base to accommodate an electric cord. During storage of the vote recorder the cord is pulled in through the opening 24*a* and is stored within the device 10**.

In order to provide a voting booth or enclosure for the vote recorder 16 during use at an election, the device 10 includes a removable voting enclosure forming member 32, preferably formed of relatively stiff corrugated paperboard or material similar to the material used for the base and cover members 12 and 14. The voting enclosure member 32 includes a rectangular back wall 34 adapted to nest against the top wall 26 of the cover member 14 and a pair of side flaps or curtains 36 hingedly attached along opposite sides of the back wall. The extended side flaps or curtains 36 serve to shield the vote recorder 16 from lateral view during use by a voter, and the upper corners of the curtains are rounded as at **36*a* to provide a neater appearance for the device 10 when being used during an election. When the vote recorder 16 is not in use, the side flaps or curtains 36 are folded back against the back wall 34 of the voting enclosure member 32, as shown in FIG. 6, and the flattened member 32 can then be nested in the cover member 14 between the opposite inside stiffening flaps 30*a* thereof. If the removable voting enclosure forming member 32 becomes damaged or mutilated during an election, it is readily replaceable independently of the base and cover members, and because the folded enclosure member 32 is nested to fit between the opposite sidewalls 30 of the cover member 14, it occupies little space when the device 10** is closed, as shown in FIGS. 1 and 2 when the vote recorder is not in use.

In addition to their function of forming an enclosure or booth for enhancing the voter's privacy while making selections on the recorder 16, the side flaps or curtains 36 also serve to maintain the cover member 14 in an upright position, as shown in FIGS. 3, 4, and 5. For this purpose, the side flaps are adapted to nest within the base member 12, as best shown in FIGS. 3 and 5, with the lower portions of the side flaps seated against the inside stiffening walls **20*a***.

From the foregoing, it is seen that the device 10 is easily converted from a storage container to a voting booth by opening the cover member 14 and folding the curtain flaps 36 of the removable voting enclosure member 32 outwardly. Should the removable voting enclosure forming member 32 become damaged or mutilated during an election, the member may be easily replaced at relatively low cost. No fasteners or other connections are required to hold the enclosure member 32 in an open position for voting because of the self-supporting nested arrangement, as shown in FIGS. 4, 5, and 6.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A combination storage container and voting booth enclosure for a vote recorder comprising a base having a bottom wall and a plurality of upstanding sidewalls forming a storage and shipping container for said vote recorder, a cover member including a top wall hingedly connected to said base along an upper edge of one of said sidewalls, said cover member movable between a closed position and an upstanding position for voting, and a replaceable, U-shaped, voting enclosure member removably nested in said cover member against said top wall, said voting enclosure member including a back wall and a pair of side curtain flaps hingedly joined to opposite edges of said back wall, said side curtain flaps being movable between a folded position adjacent said back wall and an extended position normal thereto forming said voting enclosure, said side curtain flaps including lower edge portions extended into said base and nested adjacent opposite sidewalls thereof for supporting said back wall and cover member in an upright position relative to said base for voting.

2. The combination of claim 1 wherein said cover member includes a plurality of depending sidewalls connected with said top wall and adapted to nest inside adjacent upstanding sidewalls of said base when said cover member is in closed position forming a storage and shipping container for said vote recorder.

3. The combination of claim 2 wherein a pair of said depending sidewalls are disposed along opposite side edges of said top wall and said side curtain flaps of said voting enclosure member are nested between said one pair of depending sidewalls and between opposite sidewalls of said base when said voting enclosure is positioned in an upright, flap extended position for voting.

References Cited

UNITED STATES PATENTS

| | | | |
|---|---|---|---|
| 880,410 | 2/1908 | Singer | 206—45.29 |
| 1,060,719 | 5/1913 | Stecher | 206—45.29 |
| 1,903,461 | 4/1933 | Keller | 206—45.29 |
| 2,131,239 | 9/1938 | Tiskey | 206—45.29 |
| 3,322,478 | 5/1967 | Brown | 312—259 |

JAMES T. McCALL, Primary Examiner